US009495229B2

(12) United States Patent
Todd

(10) Patent No.: US 9,495,229 B2
(45) Date of Patent: Nov. 15, 2016

(54) METHODS, APPARATUS AND COMPUTER PROGRAMS FOR MANAGING PERSISTENCE

(75) Inventor: Stephen J. Todd, Winchester (GB)

(73) Assignee: International Business Machines Corporation, Armonk, NY (US)

(*) Notice: Subject to any disclaimer, the term of this patent is extended or adjusted under 35 U.S.C. 154(b) by 1013 days.

(21) Appl. No.: 12/307,255

(22) PCT Filed: Jun. 26, 2007

(86) PCT No.: PCT/EP2007/056373
§ 371 (c)(1),
(2), (4) Date: Sep. 8, 2009

(87) PCT Pub. No.: WO2008/003617
PCT Pub. Date: Jan. 10, 2008

(65) Prior Publication Data
US 2010/0017441 A1    Jan. 21, 2010

(30) Foreign Application Priority Data
Jul. 1, 2006 (GB) .................................. 0613192.4

(51) Int. Cl.
G06F 7/00      (2006.01)
G06F 9/54      (2006.01)
G06F 11/00     (2006.01)
G06Q 10/06     (2012.01)
G06F 11/14     (2006.01)

(52) U.S. Cl.
CPC ............ G06F 9/546 (2013.01); G06F 11/008 (2013.01); G06Q 10/0635 (2013.01); G06F 11/1471 (2013.01)

(58) Field of Classification Search
CPC ... G06F 9/546; G06F 11/008; G06F 11/1471
See application file for complete search history.

(56) References Cited

U.S. PATENT DOCUMENTS 5,452,430 A     9/1995  Dievendorff
6,442,139 B1 *  8/2002  Hosein .................. H04L 47/10
                                              370/236

(Continued)

FOREIGN PATENT DOCUMENTS

TW    200303690 A    9/2003
TW    200532488 A   10/2005
WO    WO0117169     3/2001

OTHER PUBLICATIONS

C. Mohan; D. Dievendorff; "Recent Work on Distributed Commit Protocols, and Recoverable Messaging and Queuing"; IEEE Data Engineering Bulletin, 1994; pp. 22-28.

Primary Examiner — Usmaan Saeed
Assistant Examiner — Paul Kim
(74) Attorney, Agent, or Firm — Steven M. Greenberg, Esq.; CRGO Law

(57) ABSTRACT

Described are methods, apparatus and computer programs for managing persistence within a data processing system such as a messaging system, database system or file system. The method for managing persistence includes a deferred evaluation (230,330,430) of at least one criterion associated with costs and/or benefits of saving to persistent storage, instead of persistence behavior being fully predefined. The evaluation may be performed when a disk write is about to be performed (240,340,440), or at various times during processing of a data update and at various points within a data processing network. In a messaging solution, the method for managing persistence includes a dynamic evaluation (230,330,430) of costs and/or benefits of saving to persistent storage, with the evaluation being performed at various points in the messaging network after the message has been created and sent by the originating entity. The method includes determining whether message data and/or log records relating to the message require saving to persistent storage, in accordance with the costs and/or benefits of saving to persistent storage. The benefits of persisting may be determined with reference to a message value (400).

18 Claims, 7 Drawing Sheets

(56) References Cited

U.S. PATENT DOCUMENTS

| | | |
|---|---|---|
| 6,883,101 B1 | 4/2005 | Fox et al. |
| 7,343,453 B2 | 3/2008 | Prahlad et al. |
| 2003/0070092 A1 | 4/2003 | Hawkes et al. |
| 2004/0215998 A1 | 10/2004 | Buxton |
| 2005/0060374 A1 | 3/2005 | Phillips |
| 2006/0064555 A1 | 3/2006 | Prahlad |
| 2010/0293112 A1* | 11/2010 | Prahlad et al. ............... 705/418 |

* cited by examiner

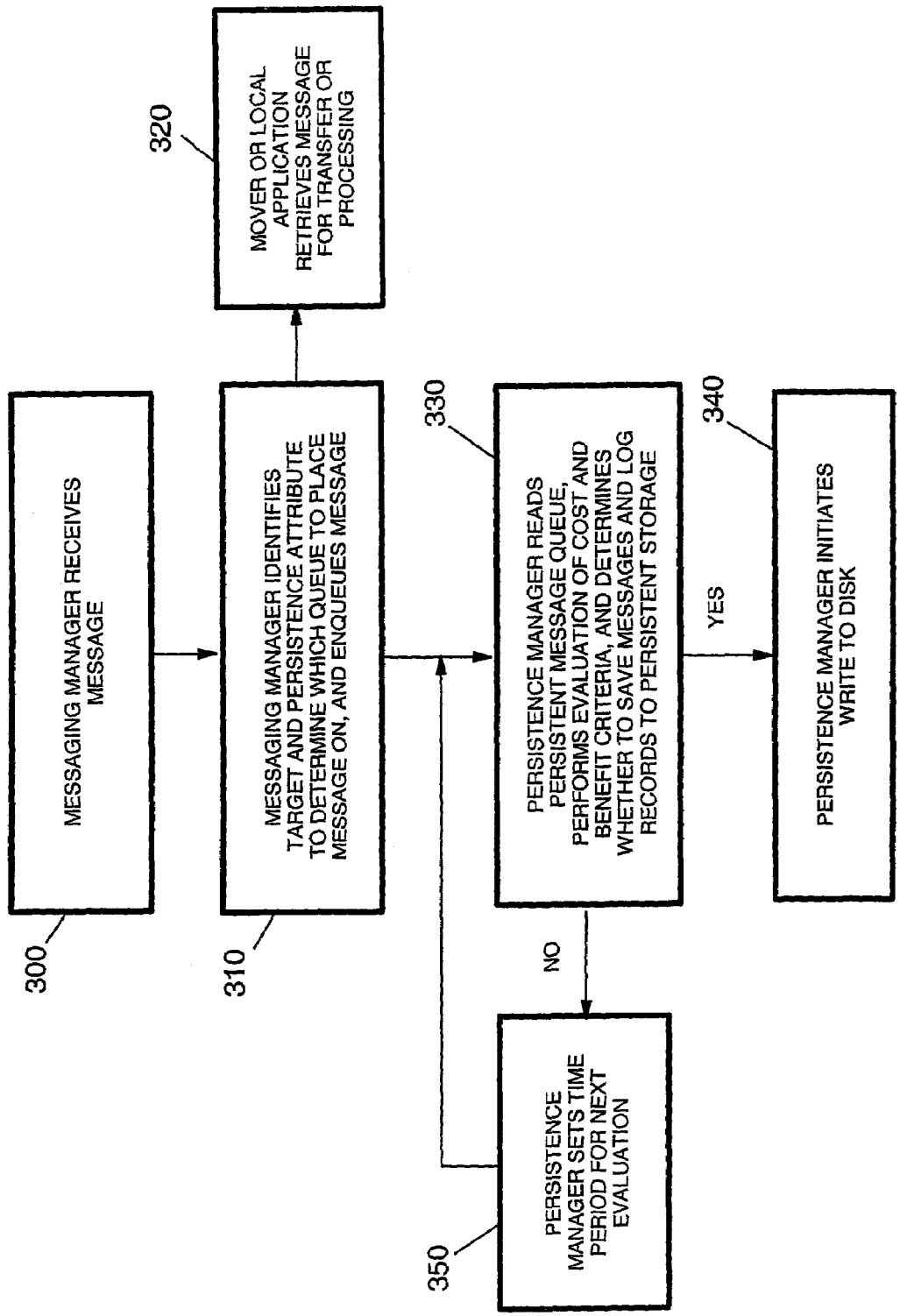

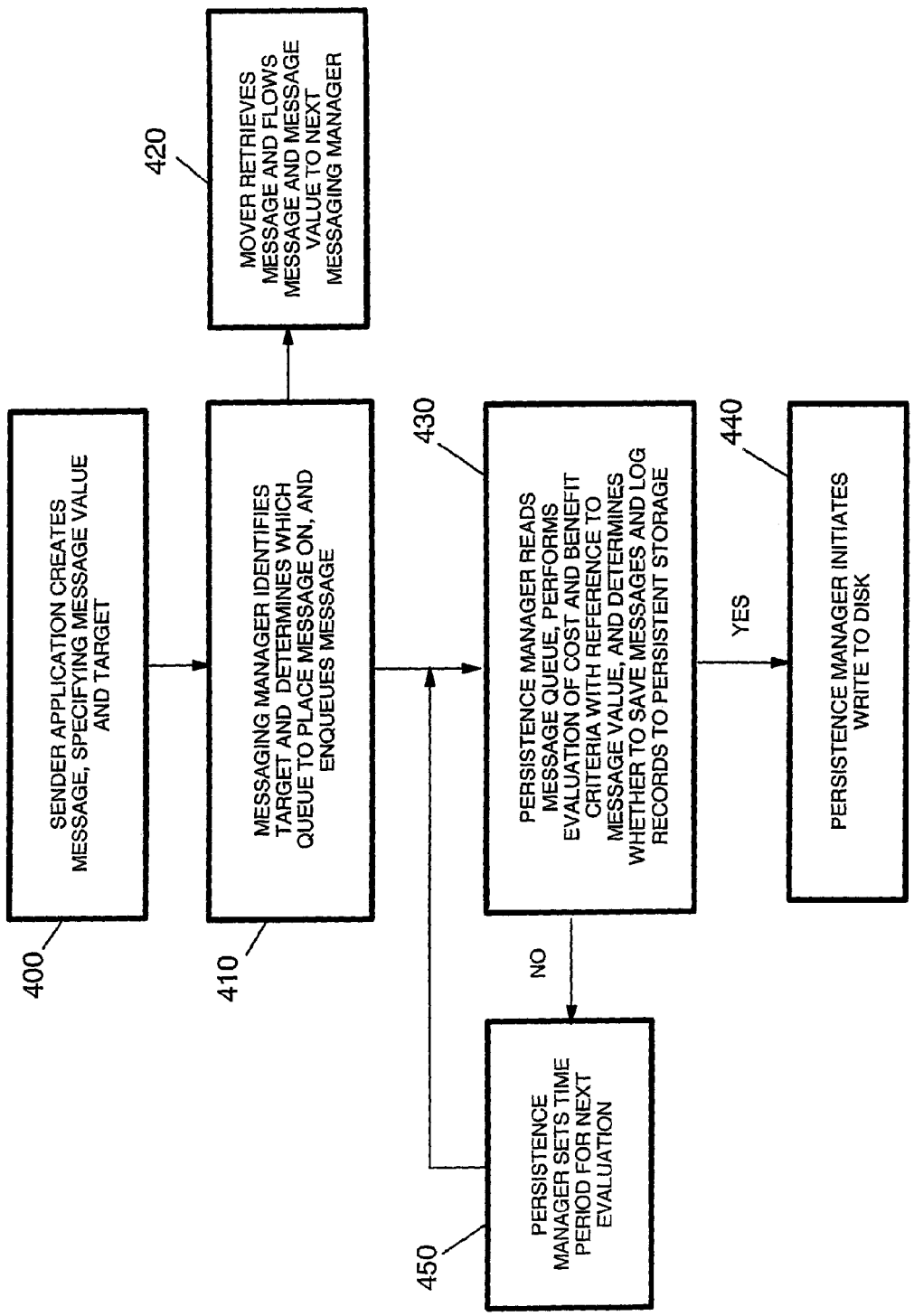

METHODS, APPARATUS AND COMPUTER PROGRAMS FOR MANAGING PERSISTENCE

CROSS-REFERENCE TO RELATED APPLICATIONS

This application is a Submission Under 35 U.S.C. §371 for U.S. National Stage Patent Application of International Application Number PCT/EP2007/056373 filed 26 Jun. 2007, and entitled METHODS, APPARATUS AND COMPUTER PROGRAMS FOR MANAGING PERSISTENCE, which is related to and claims priority to GB0613192.4, filed 1 Jul. 2006, the entirety of both are incorporated herein by reference.

FIELD OF INVENTION

The present invention relates to management of persistence, for data processing systems such as messaging systems, file systems and databases.

BACKGROUND

Some known messaging systems provide 'persistent' messaging, in which message state information and messages are saved to logs and message queue data files in persistent storage (i.e. non-volatile storage such as disk storage). Persistently stored messages are able to survive most failures and restarts of the messaging system. In response to a failure other than a disk failure, the message state information and messages can be recovered from the logged data and persistently-stored queues. The recoverability of persistent messages and state information is a significant factor in achieving assured once-only message delivery.

For example, a messaging manager may save a persistent message to disk storage before confirming to an application program that an operation has been successfully performed on the message. In a typical messaging network, a message-sending application program issues a 'put_message' instruction via an API call, to place an outgoing message in a queue. A local messaging manager program manages this queue and communicates with other local application programs, or other messaging managers within a distributed messaging network, to transfer the message to a target recipient. In a persistent messaging system, the local messaging manager saves the message to persistent storage before confirming to the sender application that the 'put_message' operation completed successfully. A persistent message or message-related data may be written to disk for every 'put_message' and 'get_message' that is performed in order to transfer the message to its destination (in some implementations, where the message is outside the current syncpoint-manager controlled 'unit of work'), or the message may only be logged when a current unit of work is committed. With distributed units of work, it may be possible to avoid writing logs at a number of intermediate points during a message transfer, but a message that is identified as 'persistent' will be written to persistent storage at a pre-defined point.

In contrast, 'non-persistent' messages are not saved to disk and so they are discarded when a messaging manager experiences a failure and has to restart, as well as when the messaging manager is stopped by an operator command. Although persistent messaging provides great advantages in terms of recoverability and assured message delivery, persistent messaging also has a performance cost. Writing to disk for every 'put_message' and 'get_message' operation will reduce message throughput and increase application response times, so there is a business justification for handling some messages non-persistently.

Because of the tradeoff between assured message delivery and performance, the WebSphere MQ family of products from IBM Corporation include support for setting persistence or non-persistence as optional attributes of a message and considerable work has been done to improve performance of persistent messaging (WebSphere and IBM are trademarks of International Business Machines Corporation). Performance has been enhanced by use of high performance disk storage, commit processing techniques that optimize performance in the absence of failures, and efficient recovery techniques to deal with failures. For example, U.S. Pat. No. 5,452,430, filed on 23 Mar. 1994 and assigned to IBM Corporation, describes an approach to handling persistent and non-persistent messages that aims to reduce delays during recovery from a system failure, by storing persistent and non-persistent data in separate sets of pages within a single message queue. C. Mohan and D. Dievendorff, "Recent Work on Distributed Commit Protocols, and Recoverable Messaging and Queuing" IEEE Data Engineering Bulletin, 17(1), pages 22-28, 1994, describes developments in the areas of distributed commit protocols and recoverable messaging and queuing.

However, typical messaging systems still have a relatively inflexible specification of persistence. One proposal is to give messaging system users an opportunity to specify a different persistence policy for different defined system states. In such a messaging system, users would benefit from increased granularity of control over persistence, but the persistence behaviour is still fixed when the persistence policy is specified.

When message persistence has been specified as a desired characteristic, typical messaging systems still invest too much of their resources on ensuring message integrity. In many applications, a high proportion of individual messages have too low a business value to justify this investment, but typical prior art solutions are not able to differentiate between messages of differing value or to take account of the costs of persisting or the risks of not persisting.

In addition to messaging systems, the trade-off between performance and persistence also applies to databases, file systems and other persistent systems. In database systems, data is typically saved persistently but it is also known to store some tables without forcing writes to persistent storage, so that the benefits of query/structuring capability can be obtained in a low-overhead storage solution. This move towards 'lightweight' database solutions is likely to lead to a greater need for flexible approaches to persistence management. File systems are increasingly used for reliable data—for example holding configuration data for an application server in XML files within a file system. There is increasing demand for transactional file systems, but the current solutions do not provide flexible persistence control.

SUMMARY

A first aspect of the present invention provides a method for managing persistence of data in a data processing system, according to an evaluation of at least one criterion associated with a cost of saving to persistent storage or a risk associated with not saving to persistent storage. The evaluation may be performed when a disk write is about to be performed, but the evaluations may be performed at various times during processing of a data update and at various points within a data processing network.

The invention can be implemented in messaging systems, database systems, file systems and other data processing systems that save data to persistent storage. A first embodiment of the invention provides a method for managing persistence of a message according to a dynamic evaluation of at least one criterion within a messaging system. The evaluation is performed dynamically in the sense of being performed after the message has been created and sent by the originating entity. The method includes determining whether message data and/or log records relating to the message require saving to persistent storage, in accordance with the resource costs or performance costs and/or the benefits of saving to persistent storage.

In this context, the benefits of saving to persistent storage ("persisting") that are considered when making a persistence determination for a particular message preferably take account of the value of the particular message and a risk of losing or duplicating data relating to a message. The benefits of persisting preferably take account of the potential cost of losing a message and/or duplicating a message delivery, or duplicating another processing operation. For example, a 'cost' of losing a message may be based on the importance of the individual message or may be based on the messaging system's ability to satisfy defined quality of service requirements. The 'cost' of persisting preferably takes account of the performance impact of writing to persistent storage, preferably with reference to the currently available resources and resource constraints such as competition for an internal persistence queue.

A determination of whether to save to persistent storage can be performed at various points as a message is transferred across a network from a sending application to a target recipient application via a local messaging manager or via a network of messaging systems. For example, it is well known that a sender application may issue a 'put_message' command to place a message on a queue managed by a local messaging manager, and the local messaging manager (or 'queue manager') may transfer the message to a next messaging manager within the network, and so on until the message reaches the local messaging manager of the target application. The target application then retrieves the message from a message queue held by the local messaging manager. According to the present invention, a persistence determination may be performed at each messaging manager within this communication path, and the message may be persisted at one messaging manager but not persisted at another, depending on dynamic characteristics affecting each of the messaging managers.

This deferred and potentially repeated determination of whether to write to persistent storage is a significant differentiation from typical messaging systems in which the persistence behaviour is defined when the message is created or is first sent.

For example, if a message is quickly moved from a first queue manager QM1 to a second queue manager QM2, it may not be necessary to save the message persistently at QM1. If the message then waits at QM2 for a period because the final consuming application is slow or inactive, the message may be persisted at QM2. A 'mover' (also known as a message channel agent) is a message queue manager component that is responsible for moving a message from a transmission queue on QM1 to a queue on QM2. If a mover is slow or inactive when a message is put to a queue managed by QM1, the message can be persisted at QM1. When the mover finally moves the message, if the consuming application is then active, it may be unnecessary to persist the message at QM2. Note that these are merely examples of the possible effects of a flexible and dynamic determination of whether and when it is desirable to persistently store a message or persistently log an operation performed on a message. Additional examples will be described in the section 'Description of Embodiments' below.

One embodiment of the invention provides a method for managing persistence of a message during handling of the message via a messaging system, the method comprising: evaluating at least one criterion of a set of criteria, the set of criteria representing costs of saving and risks associated with not saving data to persistent storage, to determine whether data relating to the message requires saving to persistent storage; and saving data relating to the message to persistent storage in response to the evaluating step determining that a save to persistent storage is required.

A second embodiment provides a method for managing persistence of data within a database, comprising the steps of: evaluating at least one criterion representing a cost or benefit of saving data to persistent storage, to determine whether the data requires saving to persistent storage; and saving the data to persistent storage in response to the evaluating step determining that a save to persistent storage is required. The evaluation may be performed for a particular data insert, delete or update or for a set of operations affecting the database.

Another aspect of the invention provides a data processing system including a persistence manager for implementing a method as described above, for example a database or messaging system. A data processing system according to one embodiment of the invention comprises: a volatile data store; a non-volatile data store; a database manager for applying data updates to database tables held in the volatile data store; and a persistence manager for determining whether data updates require saving to the non-volatile data store. The persistence manager evaluates at least one criterion representing a cost or benefit of saving to the non-volatile data store, to determine whether the data update requires saving to the non-volatile data store, and then responds to a positive determination by initiating saving of the data update to the non-volatile data store.

A messaging system according to one embodiment comprises: a volatile data store such as random access memory; a non-volatile data store such as disk storage; a messaging manager for handling message delivery; and a persistence manager for determining whether data relating to a message requires saving to the non-volatile data store. The persistence manager evaluates at least one criterion representing a cost or benefit of saving to the non-volatile data store, to determine whether data relating to a message requires saving to the non-volatile data store. The persistence manager is able to perform this determination dynamically, either when an operation is performed on the message or subsequently, with reference to the current resource costs and/or the benefits of saving to persistent storage. The persistence manager initiates saving of data relating to a message to the non-volatile data store in response to the evaluating step determining that a save to persistent storage is required.

In one embodiment of the invention, the determination of whether to save to persistent storage is made when a log write is imminent, checking which operations should be included in the log write. In another embodiment, the determination is triggered by an asynchronous alert—such as in response to a shut down of the application program or message channel agent that is processing this queue, or in response to the queue depth exceeding a threshold number of messages, or in response to a message having been queued for more than a threshold number of milliseconds.

A third aspect of the invention provides a computer program comprising a set of instructions for controlling the performance of operations in a data processing system, to implement a method as described above. The computer program is preferably provided as a computer program product in which the set of instructions is implemented by computer program code recorded on a recording medium or data transfer medium. Such computer program code may be made available for transfer via a data communications medium.

BRIEF DESCRIPTION OF DRAWINGS

Embodiments of the invention are described below in more detail, by way of example, with reference to the accompanying drawings in which:

FIGS. 4A and 4B are simplified flow diagrams representing steps of a method for managing persistence according to an embodiment of the invention;

FIG. 5 is a simplified flow diagram showing steps of a method according to another embodiment of the invention.

DESCRIPTION OF EMBODIMENTS

The present invention is implementable within a single data processing system or within a distributed data processing network, and provides increased flexibility compared with some existing data processing systems by implementing a novel approach to managing persistence. Described below is a first embodiment of the invention for use in a messaging network.

Figure 1:
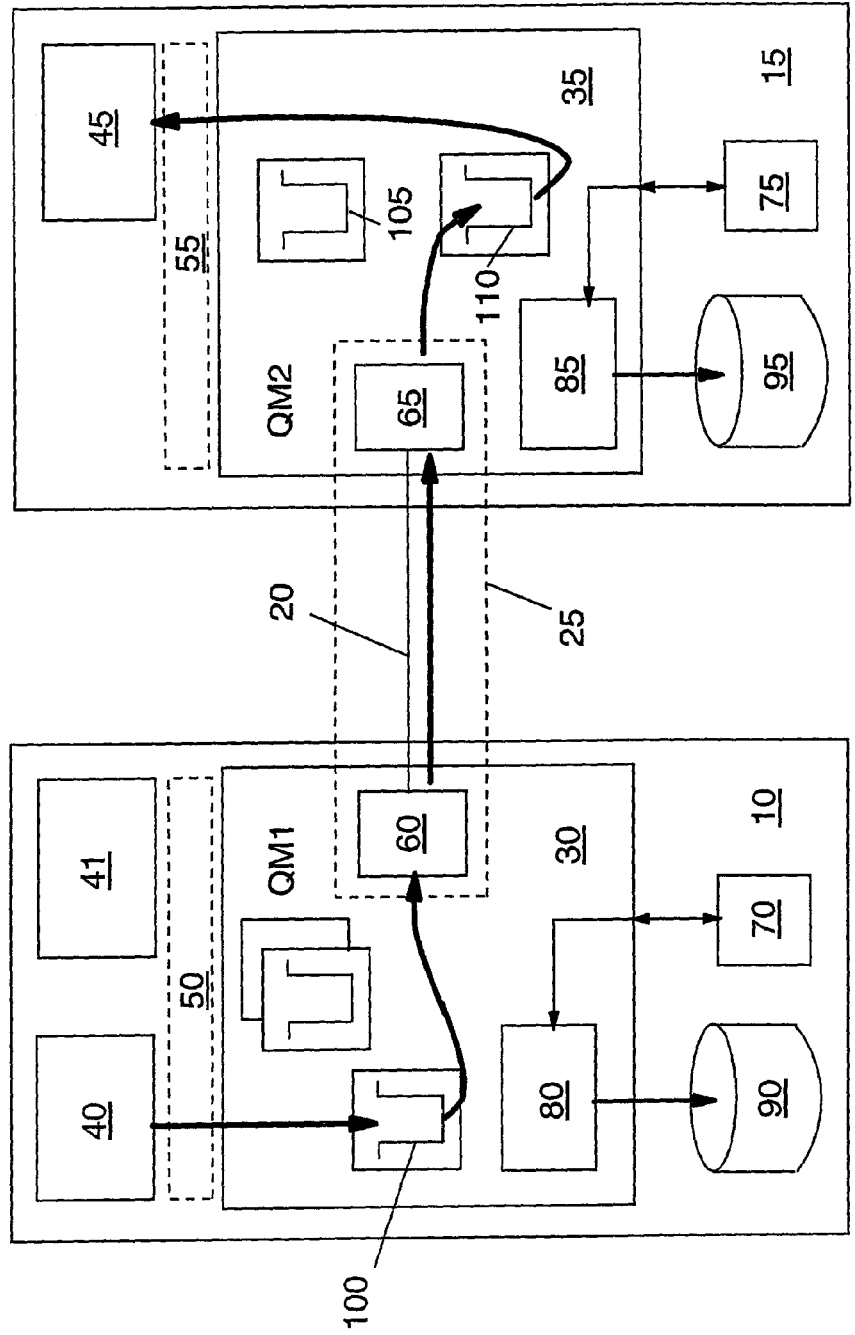
FIG. 1 is a schematic representation of a simple distributed messaging system, as is known in the art.

A typical distributed messaging network comprises a plurality of data processing systems 10,15 connected via communication links 20. A simple example network including only two connected data processing systems is shown in FIG. 1, but a messaging network may include, for example, hundreds of separate data processing systems. Each data processing system 10,15 in the messaging network includes a messaging manager 30,35, which may be implemented in computer program code or in hardware using electronic circuits. The messaging functions on a particular data processing system 10 may be integral with an application program 40, 41 that performs business processing, but in the present embodiment the application programs 40,41,45 and messaging managers 30,35 are separate, interoperating computer programs. The application programs 40,41,45 can communicate with each other via the messaging network, and each communicate with a local messaging manager program 30,35 via a messaging interface (API) 50,55. Each messaging manager 30,35 relies on the processing functions of a hardware processor (not shown) and relies on services provided by an operating system (not shown) on the data processing system on which it runs, and the messaging managers deal with any data transformations required to address operating system differences between systems within the network. The above-described components within a data processing system, and a random access memory 70,75 and non-volatile disk storage 90,95 are connected via a communications bus as is well known in the art.

Since the present invention is applicable to a number of conventional data processing system hardware and operating system architectures, the standard features of known data processing systems are not described in more detail herein.

The messaging system architecture of FIG. 1 facilitates relatively simple application program development, and addresses many of the problems associated with integration and interoperation between a diverse set of components within a typical heterogeneous distributed data processing environment. Common messaging functions can be implemented within a messaging manager 30,35 and the application programs 40,41,45 can be written to call functions of the respective local messaging manager via the messaging API 50,55. Messaging managers 30,35 such as the WebSphere MQ messaging manager programs from IBM Corporation provide asynchronous message communication via message queues that are managed by the messaging managers.

For example, a first application program 40 running on a first data processing system 10 can communicate with a remote application program 45 by placing a message on a transmission queue 100 that is managed by the local messaging manager 30. A message queue, such as a transmission queue 100 or an input queue 110 of a local application program 45, is simply an area of storage that is reserved by the corresponding messaging manager to hold messages on their way from one program to another. Although represented schematically in FIG. 1 as elements of a messaging manager, the message queues 100,105,110 are held in volatile random access memory 70,75 and are hardened to disk storage 90,95 under the control of a persistence manager 80,85 as described below.

A communication channel 25 is established between a pair of message channel agents 60,65 (or 'movers') over the communication link 20 between the first system 10 and the remote system 15. The local messaging manager examines the header of messages placed in the transmission queue 100 to determine a next messaging manager within the network to which the message should be routed and then the movers 60,65 are responsible for transferring relevant messages from the transmission queue 100 to a queue managed by the second messaging manager 35. If the second messaging manager is merely an intermediate node on route to a destination messaging manager, the new queue is again a transmission queue 105 that serves as a temporary repository for the message until the message can be forwarded to the next network node, but if the second messaging manager 35 is the local messaging manager for the destination application program 45, the message will be placed in an application input queue 110 that is serviced by the application program 45 when the application is ready to process the message.

The steps of placing the message on the first transmission queue 100, moving the message to the application input queue 110, and the application program 45 retrieving the message from this input queue 110 are performed asynchronously, such that there is no need for a permanent, dedicated connection between the application programs 40,45. Although not shown in FIG. 1, there may be multiple asynchronous hops across a network from a first sending system 10 to a remote destination system 15.

In some known messaging systems, messages may be transmitted persistently or non-persistently as specified by a system administrator or sending application. A persistence manager 80,85 writes messages to a persistent store 90,95 (for example, non-volatile disk storage) in accordance with the specified persistence required by the communicating application programs or messaging managers (either required for all messages sent between those applications or messaging managers, or for particular messages only). A persistent message may be saved to the local persistent store 90 when the message is placed on the first transmission queue 100 by the sender application's local messaging manager 30 (i.e. a copy of the queue may be saved to disk storage), and a local log record may be written to the local persistent store 90 both when the message is put to the transmission queue 100 and when the message is successfully moved from the transmission queue 100 to the application input queue 110. The message and associated log records may be written to a second persistent store 95 on the second system 15 when the message is placed in the application input queue 110, and log records may also be written when the message is retrieved from this queue 110 by the target application program 45.

In some messaging systems, log records must be written before an operation such as putting a message onto a queue or retrieving the message from the queue is defined as complete, because the log records are required to enable recovery following a system failure. However, updates to the persistent copy of a queue may be written 'lazily' (as a background task, except with forcing of lazy writes on normal system shutdown).

Despite the advantages of recoverability and consequent assurance of message delivery that is achievable when persistently writing log records, such disk writes are a significant performance bottleneck. Some known systems provide support for distributed transactions that reduce the number of times log records are hardened to disk (i.e. writing to persistent storage at commit of a distributed unit of work instead of on every put, get or other update operation). Some known systems, in which many operations are running in parallel, combine log records for several operations in a single buffer and force them to disk at the same time. These features provide performance improvements, but persistence and log handling remains a performance bottleneck.

In one proposed system, users are able to specify a desired persistence policy that enables different persistence behaviour to be set for different system states. However, the behaviour is still predefined when the persistence requirements are specified, and so real flexibility has not been achieved in the sense of dynamic responsiveness to current circumstances and costs and benefits of saving to persistent storage.

The present invention provides greater flexibility by avoiding the limitation to a predefined and inflexible specification of required persistence. Some persistent save operations can be avoided entirely, by performing a deferred determination of whether to save to persistent storage based on a set of criteria including message value and the costs and benefits of saving to persistent storage. The cost and benefit criteria may be assessed at various points within a messaging network as a message progresses from the message sender to the message's destination.

Figure 2:
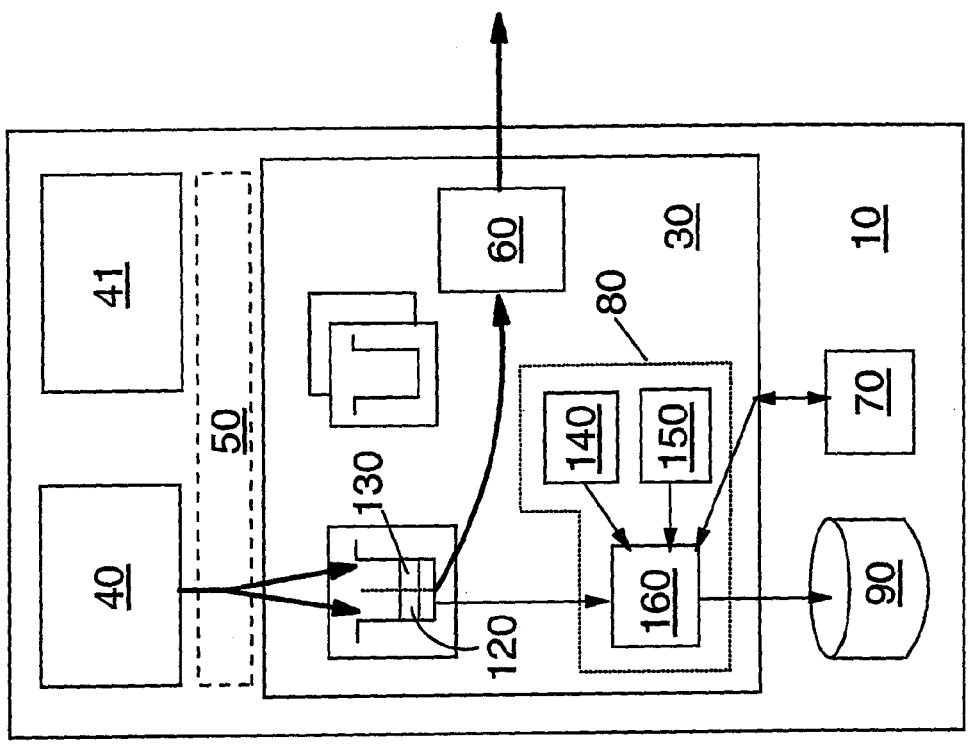
FIG. 2 is a schematic representation of a messaging system in which the present invention may be implemented, showing system components that can cooperate to achieve persistence management according to an embodiment of the invention.

A messaging system 10 according to a first embodiment of the invention is described below with reference to FIG. 2. Application programs 40,41 are able to interact with each other and with other application programs (that may be located elsewhere in the network) via a messaging manager 30. The messaging manager 30 handles transfers of messages across a network in response to API calls made by the application programs, and makes use of the available network communications features and operating system features of the local data processing system 10. The messaging local application programs, API 50 and messaging manager 30 are represented schematically in FIG. 2. A volatile random access memory 70 and non-volatile disk storage 90 are also represented schematically in this FIG. 2.

When an application creates a message, a persistence attribute is associated with the message. As is known in the art, the attribute may specify 'persistent' or 'non-persistent' or a third option in which it is specified that persistence will be based on the queue definition of a queue onto which the message is placed. The persistence attribute may be set automatically and consistently for each message (using default message descriptor settings for the application or for the queue onto which the message is placed), or the application program may optionally use a persistence field within the message descriptor to specify that an individual message is either 'persistent' or 'non-persistent'. In typical messaging systems, a 'persistent' message requires saving to persistent storage whereas a 'non-persistent' message does not require saving to persistent storage because its loss (i.e. an occasional message loss) can be tolerated by the application. Thus, an application-specified persistence attribute defines subsequent behaviour in a typical messaging system. A program that retrieves and reads the message can access the persistence attribute and may ensure that any reply message is sent with the same persistence as the message it is replying to.

In some known messaging systems, a message consists of two distinct parts—application-specific data that is often referred to as the message contents or message payload, and a message header that includes a message descriptor (MQMD) and other structured fields. The application data is not limited to any particular data type and may comprise, for example, character strings, byte strings, binary integers, floating point numbers, and so on. The structured fields hold a description of the message including such information as a version number for the messaging manager 30 that created the message, a clock value for handling messages in time sequence order, a data length and possibly an expiry interval. The message descriptor is passed by the sender application program 40 to the messaging manager 30, and then by the messaging manager 30 to the receiving application program 45. The message descriptor can contain the persistence attribute (MQMD.persistence) and a priority attribute (MQMD.priority), if required by the sender application program. The priority attribute is provided to allow sender applications to indicate the urgency of a message, and priority values may be taken into account by messaging managers when determining the order of messages within the message queues. However, the destination queue may be defined as a First-In-First-Out (FIFO) queue in which case the priority attribute may be ignored.

As mentioned above, the present invention implements a less rigid approach to persistence management, but some embodiments of the invention make use of the persistence attributes described above. In a first embodiment, the persistence attribute indicates whether a message should always be handled non-persistently (as described above for conventional handling of non-persistent messages) or whether the message should be handled persistently when the benefits of saving to persistent storage justify the costs. Messages labeled 'persistent' by the sending application have a persistence determination performed for them after a message originator sends the message. This deferred cost/benefit comparison for 'nominally-persistent' messages differentiates from conventional solutions, which do not make persistence determinations based on an evaluation of dynamic criteria within the messaging system after the message has been sent. In this embodiment of the present invention, a 'nominally-persistent' message is only saved to persistent storage when justified by a set of criteria (i.e. at least one criterion) that are evaluated during handling of the message by the messaging system, instead of always saving such messages persistently.

The sender application program 40 puts a new message onto a queue by specifying the application-specific message data and the message descriptor. The message descriptor identifies a target message queue and the target messaging manager 35 and this is used to identify a first message queue to which the message should be added. A network of messaging managers handles transfer of the message from this first message queue to the input queue of the target application program (in the limited scenario of two applications running on the same data processing apparatus, a single messaging manager can support communications between them but in most scenarios there is a distributed network of messaging managers to support asynchronous message transfer across a distributed physical network).

When a messaging manager or receiving application retrieves a message from a respective transmission queue or application-input queue, the messaging manager or receiving application program specifies some information about the message to be retrieved and specifies an empty area of buffer storage to place the message into (and the length of that area of buffer storage). The retrieving messaging manager processes the message in accordance with the specified persistence attribute.

In a first example embodiment of the invention, non-persistent and 'nominally-persistent' messages are placed in separate page sets 120,130 within a single message queue to simplify message ordering and to enable efficient recovery processing in the event of a failure. Such a solution is described in U.S. Pat. No. 5,452,430—except that in U.S. Pat. No. 5,452,430 the persistence attribute is definitive of subsequent persistence behaviour without reference to the cost and/or benefit of saving to persistent storage. In the present embodiment, the messages held in page sets allocated to non-persistent messages are not intended to be saved persistently, but any messages held in the page sets assigned to nominally-persistent messages are scheduled for writing to non-volatile disk storage. Before actually writing the data to disk storage, an evaluation of persistence cost and benefit factors is performed.

The evaluation of persistence costs and benefits may be performed at various times and may take account of several factors. Firstly, the evaluation can be performed by a messaging manager when a message is originally written to a queue by that messaging manager, as the message passes through the messaging network. This enables valuable messages to be saved to persistent storage immediately. Other 'trigger events' prompting performance of the evaluation can be based on events within the messaging system—such as when a given queue reaches a threshold size, or when an individual message has been queued for a threshold time period. The evaluation may also be triggered by the operation of the log; for example making use of the system's awareness that it is going to force a log buffer in a millisecond, to determine that an extra operation can be logged at the same time with very low overhead. In this case, the identification of a low resource cost associated with persisting a particular log record means the log record may be written to disk earlier than would otherwise be the case. Other 'trigger events' may include system events: for example when the messaging manager is warned of impending system shutdown, or potential system failure. The latter example may be detected if the disk storage subsystem detects a pattern of bad sector writes.

Such 'trigger events' and thresholds for the evaluation of costs and benefits of saving to persistent storage may be dynamic for each message. For example, the evaluation performed by a messaging manager when a message is first put to a queue may determine that a message is quite valuable, but not valuable enough to write immediately. This initial evaluation will then set a short time period as a trigger event on that particular message. When that period expires (i.e. the 'trigger event' occurs), the message may be forced to disk without further evaluation, or a second evaluation may be performed.

Since an initial evaluation may involve significant processing, such as to determine a 'message value' (see below) or other data, in a first embodiment of the invention the data collected for the first evaluation is flowed through the network and subsequent evaluations performed for the same message reuses that collected data. In one embodiment, the communication protocol used to pass messages between messaging managers is extended to enable a computed message value to be passed with the message, to enable efficient evaluation of persistence at connected messaging managers. In other embodiments, a messaging API is extended to enable a message value to be specified, for example within an additional field of the message header (as described in more detail below).

At each messaging manager 30, a data collector component 140 maintains a collection of message-specific data including a message value and more general message processing statistics for use in the evaluation of costs and benefits for messages held on the local system. A set of rules are held in a rules repository 150 and are applied to the collected data by an evaluation component 160 of the persistence manager 80. The collector component 140 discovers various pieces of information from an analysis of processing performance and data structures within the messaging manager 30, and then updates a set of database tables with that information.

The message value may be determined by a messaging manager in one of several ways. For example, a message value may be computed based on the message type, and with reference to rules associated with the queue on which the message is placed. Alternatively, a message value may be determined by a receiving messaging manager by analysis of the message contents (for example, where communicating application programs are handling funds transfers and values are specified within the message contents), or by reference to a message value field within the message header. The latter example solution is applicable to embodiments of the invention in which a message value is specified by the sender application via the messaging API (see below), and embodiments in which a message value is computed once-only by the sender application's local messaging manager.

In higher level architectures, such as Service Oriented Architectures (SOA), it is common for systems implementing the architecture to hold an association between a queue, the message types that are permitted for messages on that queue, the format of messages of these types, and other semantic information relating to the messages and their processing. In an SOA implementation of the present invention, the semantic information includes message value (or components within the SOA implement rules to compute such values). This information is communicated to the messaging manager by the higher level semantic components without the need for explicit programming of the messaging API. The messaging manager does not need to be aware of whether such message value has been provided directly through messaging API's or has been determined via a higher level SOA system.

In a more primitive system, similar effects may be achieved by the use of API crossing exits that understand the semantics of the message and can extract or derive a message value. Again, the messageValue is transmitted to the messaging system without explicit API code needing to be written by the application programmer. Again, the messaging system may not be aware of the source of the message value information.

Queue depth is also monitored (as in some known messaging systems) and this data is provided to the data collector component 140. Additionally, the time a message has remained in a queue is monitored together with the total data size of items held in a queue (and this monitoring involves little overhead since the information is already available, although not explicitly monitored, in known messaging systems). Additionally, the rate of messages being read from a queue and the typical time messages remain in a queue can be monitored, together with more advanced statistics-based estimates such as the expected time to reach the head of the queue. CPU overhead is another system characteristic that is often monitored in known systems, and this data may be important for persistence evaluations since very high CPU loads often correlate with system failures. Additionally, some programs are known to have an adverse effect on other programs, and this may be factored into the determination of whether or not to perform a persistent save operation.

In a first example embodiment, the messaging manager 30 monitors its internal message processing rate, and provides to the collector component 140 a value representing the number of messages read from the queue per second. The collector component applies an exponential smoothing algorithm to the rate of messages being read to generate a value (messageProcessingRate) that is saved to the database. The collector component 140 also monitors the position of each message in its respective message queue (positionInQueue). This positionInQueue value is determined when the message is added to the queue, and can be updated subsequently.

The messaging manager's collector component 140 also generates a statistical average for the time between failures (meanTimeToFailure) which includes any failure of the messaging manager, the operating system or the data processing system hardware. Other statistics (some of which are already monitored by existing systems management products, such as disk write errors) and external factors such as thunderstorms, reliability of electricity supplies or risk of earthquakes that are relevant to likely system failures may equally be used.

The collector component 140 obtains (from the messaging manager 30 or operating system) a value representing the current load on the messaging system (load) and a statistical value representing the average load on the messaging system (avgLoad), and an average number of writes to disk per second for persistent messages (persistPerSec).

One or more timeInProcess values may be maintained to represent the time spent processing a message after it has been retrieved from the head of the queue. For example, where the current messaging manager 30 is the target messaging manager that is managing the input queue of the target application program, the timeInProcess is the time between retrieval of that message by a local application issuing a 'get_message' call and commit of the message retrieval operation. Where the messaging manager is an intermediate processing node between a messaging manager of a sender application and a messaging manager of a target destination application, the timeInProcess is the time between the message being retrieved from the head of a local transmission queue (into which the message is initially placed) and a commit of the message transfer operation to transfer the message to another node.

Having updated a database with the above-described data, the data can then be processed by the evaluation component 160 of the persistence manager 80 applying a set of rules held in the rules repository 150. The evaluation component processes the positionInQueue and messageProcessingRate values to compute an estimated time for the message to reach the head of the message queue (timeToHeadOfQueue):

$$timeToHeadOfQueue = positionInQueue/messageProcessingRate$$

The evaluation component also computes an estimate of the time a message will be held by the messaging manager (timeHeld):

$$timeHeld = timeToHeadOfQueue + timeInProcess$$

An estimated risk of loss of the particular message is computed with reference to the time a message will be held and the average time between failures:

$$riskOfLoss = \min(1, timeHeld/meanTimeToFailure)$$

Evaluation of this estimate of the risk of loss of the message may then be used to determine whether to perform a save to persistent storage or not. These preliminary evaluation steps by the evaluation component 160 of the persistence manager 80 take account of the risk of losing the particular message without yet considering the message value. Although some embodiments of the invention evaluate risks of message loss and determine required persistence without consideration of message value, preferred solutions evaluate the cost of losing a message based on the individual message value, either as the only factor to consider, or in combination with message performance statistics or resource cost considerations. In this way, a value representing the cost of losing a message can be combined with a value representing the risk of losing the message and additional criteria relating to the demands on system resources. For example:

$$riskCost = messageValue * riskOfLoss$$

A persistenceCost value may be calculated with reference to the load and avgLoad values and persistPerSec value, with a decision being made to save data to persistent storage when the riskCost exceeds the persistenceCost: This persistenceCost may be based on the resources required to perform saving of data to persistent storage, or an estimate of the effect of persisting on system performance may be calculated and used to influence persistence determinations.

--- if (riskCost > persistenceCost) then persistence=true
if (riskCost ≤ persistenceCost) then persistence=false

---

The persistence determination may be based on whether the messaging system needs to prioritize performance or once-only assured message delivery, according to the requirements of a quality of service agreement for a particular customer's messaging application.

Even a simple rule such as demonstrated above can be implemented in a way that will improve the cost effectiveness of a message processing system. Although the above rule demonstrates operability and illustrates how the dynamic principles of the invention may be embodied, it will be appreciated that many alternative rules may be used to determine persistence. Such rules may be more complicated than the above example, depending on the information which is available to the persistence manager.

Figure 3:
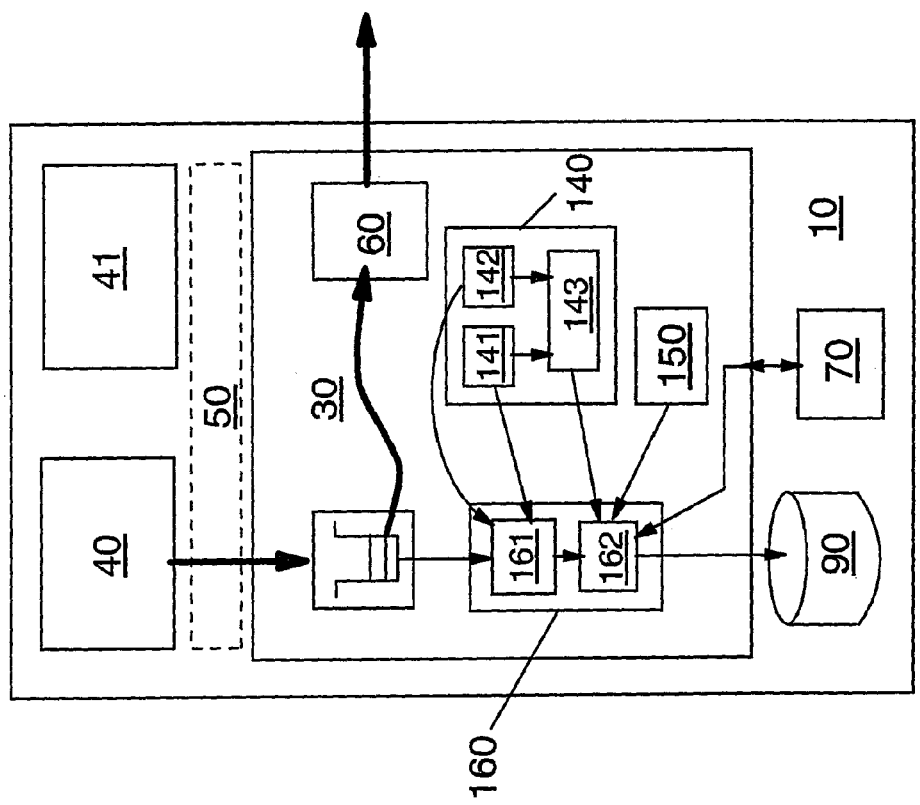
FIG. 3 shows more details of some of the components of a messaging system according to the embodiment of FIG. 2.

FIG. 3 provides some more detail of the collector 140 and evaluation 160 components of the persistence manager 80 according to one embodiment of the invention. Component 141 is a collector for information provided by the messaging manager itself—including queue depth and each message's position in a queue, and the individual messaging manager's internal message processing rate. The collector 140 also includes a separate external collector component 142 that provides data relating to the system load, an estimated mean time to failure and information relating to detected disk write errors, for example. Both components 141 and 142 provide their data to a collector database 143 which is the source of monitored data used by the evaluation processing component 162 of the evaluator 160. The evaluator 160 also includes a triggering component 161 that is responsive to events generated by the internal and external collector components 141 and 142, and is responsive to expiry of set time periods associated with persistent writes. The rules repository 150 may contain either one or both of: (i) rules relating to conditions that are specific to the operation of the messaging manager; and (ii) rules relating to conditions within the data processing system but separate from the internal workings of the messaging manager. Although representing in FIGS. 2 and 3 as internal components of the messaging manager 30, some or all components of the persistence manager 80 may be implemented as one or more components of the data processing system 10 which are separate from but cooperate with the messaging manager 30.

Let us consider an application for calculating telephone use charges, where a telephone exchange is emitting call records to be sent for customer billing. Many of the records are for only a few cents and some will have no real value, whereas some records are worth a significant amount (for example 50 cents or a dollar) and a small proportion of call records are worth many dollars. The billing application should not lose high value call records, and so these may always be handled persistently, but records of less than a threshold (for example 1 cent or 10 cents) may not have sufficient value to justify the cost of persistent handling. With a reliable data processing system, errors and failures will be relatively rare and the loss of a few low value call records can be tolerated for the sake of improved processing performance. Middle value call records may be treated as nominally-persistent but only saved to persistent storage in circumstances where the performance cost is justified by the estimated risk of message loss.

In different applications, a determination of whether to save data persistently based on an evaluation of criteria associated with costs and benefits of persisting may be applied to all data items, or only to high value items (with others treated as non-persistent), or only to low value items (with others treated persistently).

For an example 1 cent telephone call, a first messageValue=1.0. Let us assume a message processing rate of 1000 messages per second, and average timeInProcess of 0.2 seconds and an average failure rate of once every 10 days. Let us assume the message is added as the fortieth message on a queue:

```
messageValue = 1.0
messagingProcessingRate = 1000
PositionInQueue = 40
TimeToHeadOfQueue = positionInQueue / messageProcessingRate = 0.04
TimeInProcess = 0.2
TimeHeld = TimeToHeadOfQueue + timeInProcess = 0.24
meanTimeToFailure = 10 × 24 × 60 × 60 = 864000
riskOfLoss = min(1, timeHeld / meanTimeToFailure) = 2.78e−7
riskCost = messageValue * riskOfLoss = 2.78e−7
if persistenceCost = 3.17e−7 (riskCost < persistenceCost), the
message will not be saved persistently.
```

However, a ten cents telephone call would be recorded persistently, since:

```
riskCost = 10 * 2.78e−7 = 0.00000278 > 3.17e−7
riskCost > persistenceCost.
```

It should be noted that, for typical systems, persistenceCost will not be a constant value. For example, when a disk write is about to be performed for all log records held in a buffer, a persistenceCost associated with a single log record for a new message may be very low compared with the persistenceCost just after a disk write has been performed when there is no other data to write simultaneously.

In the telephone charges example, the business cost of failure to deliver a message can be very close to the cost of the call (possibly higher as some customers like an accurate record of their telephone calls). The business cost of duplicate delivery is less easily quantified (most customers react much more to duplicate charging than to under charging!) but system features outside the messaging system may be used to detect duplicates, in which case eliminating duplicates may be considered a processing cost rather than a business cost. Also, known messaging solutions already implement protocols that carefully handle recording of reading/deletion of a message and carefully handle any return acknowledgements. Therefore, this description focuses mainly on the risk and associated cost of failure to deliver a message rather than duplicates, but the invention is also applicable to evaluating the costs of duplicate delivery.

Messages may be placed on a 'persistence queue' (a queue of items intended for saving to persistent storage) based on a riskCost calculation, such as described above. In one embodiment, this riskCost and a position of each message in the queue may be periodically recalculated, or may be recalculated in response to events such as start or stop of a consumer application. High value messages may be moved to the head of the queue and be persisted quickly, whereas persisting of low value messages may be delayed relative to high value messages such that the lowest value messages are processed before being persisted.

The above example rules and the particular example referring to telephone call charges are merely illustrative of the sort of considerations that may apply to the determination of whether to save data persistently or not. Many alternative rules may be implemented with varying levels of complexity according to whether the particular system's persistence bottleneck justifies taking account of knowledge of failure predictions and statistics such as queue depth and CPU load, or parameters such as message size.

Although many variations of such rules will occur to persons skilled in the art, it will be appreciated that any such determination of whether to save data to persistent storage based on an evaluation of dynamic criteria relating to costs and benefits of saving to persistent storage is a departure from conventional solutions in which persistence behaviour is predefined. The embodiments described above will enable some persistent save operations to be omitted, reducing the performance bottleneck associated with writing logs and message queues to disk storage in circumstances where it is determined that a save to persistent storage is not required.

Some example scenarios will now be described to further illustrate the applicability and potential benefits of the invention in a messaging system. For example, where a message queue is being quickly drained by an active consumer (or a mover as described above), a persistence determination as described above may determine that messages added to the queue do not need to be saved persistently. However, if the consumer shuts down because of, for example, failure of another resource the consumer is using, another persistence determination may be performed with a different result. Using the example formula above, the increased time for which the message is likely to remain on the queue will lead to an increased riskOfLoss and therefore a higher riskCost that encourages persistently saving the messages on the queue. This decision to persist may be applicable to newly arriving messages only, or may be applied retrospectively to all waiting messages.

To illustrate this example, let us consider a messaging network in which an initial producer sends a message via a first messaging manager QM1, which then uses a mover to transfer messages to a second messaging manager QM2, which enqueues message for retrieval by a final consumer. If a typical message can be moved quickly from the initial producer to QM1 and then QM2, but the final consumer is slow or inactive, the message may not be persisted at QM1 but probably will be persisted at QM2. Alternatively, if the mover is slow or inactive when the message is put, the message will probably be persisted at QM1. If the consumer is already active when the mover finally moves the message, the message may not be persisted at QM2.

If the message has a very low value, it need not be persisted at either messaging manager; whereas if the message has a very high value, the message will be persisted at both messaging managers. High value messages may be moved to the head of the persistence queue and persisted very quickly compared with low value messages which will tend to be processed before being persisted.

As mentioned above, certain embodiments of the invention allow a message value to be specified via a messaging API. The description above included a first embodiment in which the message value (for example specified in a new message header field MQMD.messageValue) was used in combination with a persistence attribute (MQMD.persistence) that specified one of three options: PERSISTENT, NON_PERSISTENT and PERSISTENCE_AS_Q_DEF. The NON-PERSISTENT messages were described being handled conventionally and other messages were evaluated to determine whether circumstances justify their 'nominally persistent' status being disregarded. In another embodiment, a messaging system provides an extra field within a message's fixed message header (MQMD) associated with the persistence attribute (MQMD.persistence) to take a message value while also enabling a new persistence attribute option of PERSISTENCE_BY_VALUE. A message sending application program could then specify one of:

'PERSISTENT'
'NON_PERSISTENT'
'PERSISTENCE_AS_Q_DEF'
'PERSISTENCE_BY_VALUE'; value The message value field may be a 32 bit integer or 32 bit floating point number with units of cents, with a default value such as −1 indicating when the field is not set.

In another embodiment, the known 'PERSISTENCE_AS_Q_DEF' attribute value may be passed through the messaging network as far as the input queue of the final consumer application. That attribute value may be responded to by the originating messaging manager and other messaging managers by performing the present invention's evaluation and determination of persistence.

In yet another embodiment, instead of adding message value to existing persistence attributes, a message value specified via the API may provide the basis for determining persistence for all messages.

It should be noted that the present invention has been described above in the context of applications and systems for which it is desirable to reduce the overhead of persisting messages or other data updates, by avoiding some writes to persistent storage. An alternative solution treats a message sender's specification of 'persistent' as an absolute requirement, but allows valuable message specified as 'non-persistent' to benefit from persistent message handling when the evaluated criteria determine that this is appropriate. For example, very high value messages may be handled persistently or all messages may be handled persistently for a period of time following detection of an actual system failure or certain conditions indicating a risk of system failure.

Figure 4A:
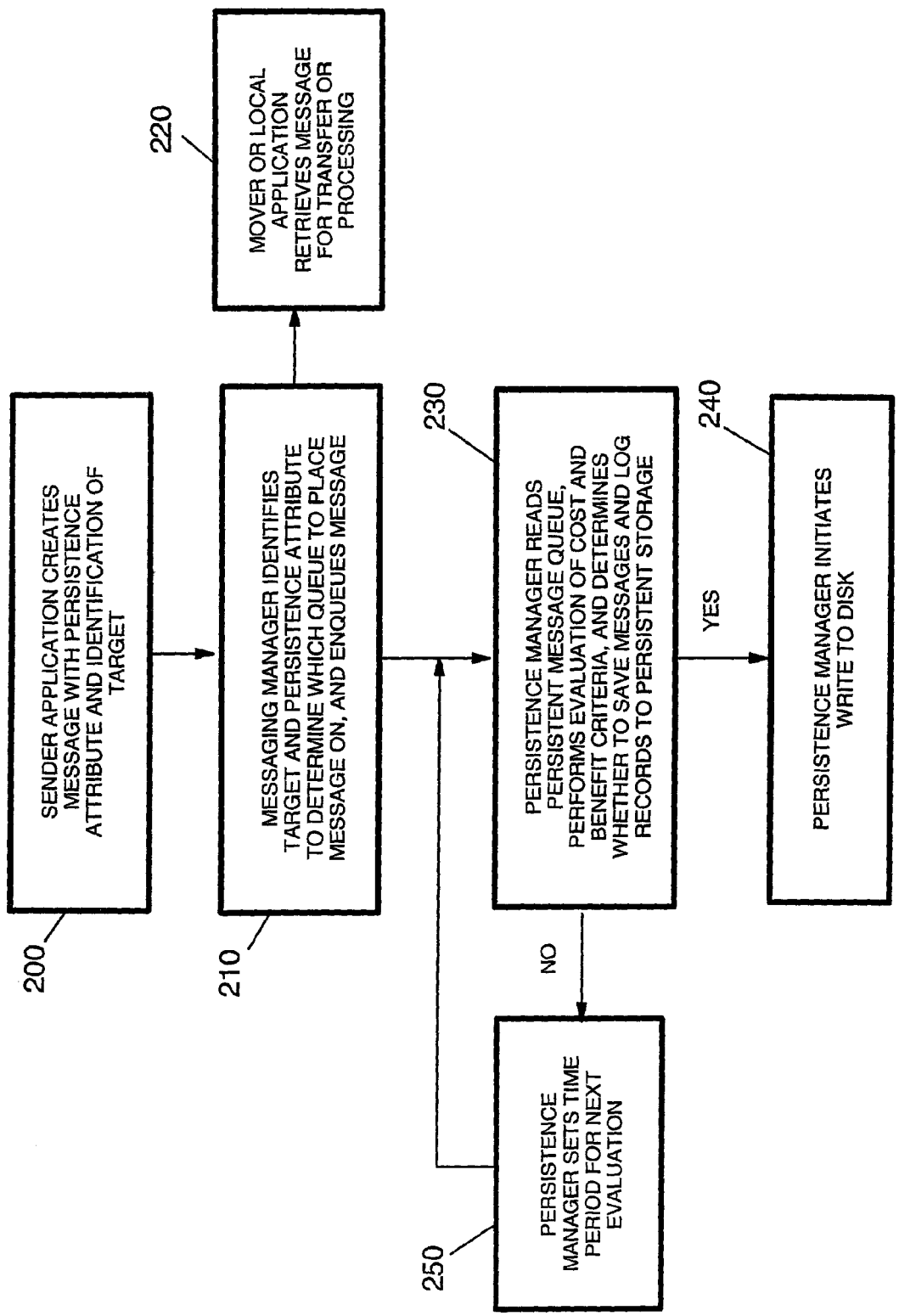

FIGS. 4 and 5 provide a simplified representation of the steps of a method according to an embodiment of the invention. As shown in FIG. 4A, the method begins with a first application program 40 creating 200 a message with a message payload and a message header that contains information about the sender, an identification of a target messaging manager and message queue, and a set of attributes. In this first embodiment, the sender application specifies one of the following persistence attributes: 'PERSISTENT', 'NON_PERSISTENT' or 'PERSISTENCE_AS_Q_DEF'. The application issues a 'put_message' command to place the message onto a message queue managed by a local messaging manager 30. The local messaging manager identifies 210 an appropriate local queue on which to place the message, based on the identification of the target messaging manager (and based on the persistence attributes in an embodiment in which persistent and non-persistent messages are enqueued in separate page sets within a queue or within separate queues). If the local queue is an intermediate transmission queue on route to a remote target queue, a mover component of the local messaging manager subsequently (and asynchronously) retrieves 220 the message for transfer to the remote messaging manager, potentially via multiple intermediate messaging managers. However, while the message is held on a queue that is managed by the local queue manager 30, the local persistence manager 80 is responsible for determining 230 whether the message and log data related to the message should be saved to persistent storage. This determination is performed either periodically or in response to a trigger condition. As stated earlier, example trigger conditions include events such as the placing of the message on the queue or detection of a system problem, or conditions such as the queue depth reaching a threshold number of messages. If the persistence manager determines that a save to persistent storage is required, the save operation is performed 240 immediately (although in other embodiments, instructions for writing to disk are themselves enqueued in a priority order). If the persistence manager determines that a save to persistent storage is not currently required, the persistence manager may set 250 a timer for a next evaluation and persistence determination for any messages remaining on the queue at the end of the set time period. More details of the method steps shown in FIG. 4A are described above.

FIG. 4B represents the steps performed by a messaging manager and persistence manager at a data processing system other than the message-originating system. The messaging manager receives 300 a message from another messaging manager and reads 310 the message header and other data fields of the message to identify the target messaging manager and target queue and to identify the message attributes such as priority and the specified persistence. Thereafter, the message is handled in the same way as shown in FIG. 4A, with either a mover or local application program retrieving 320 the message, a persistence manager performing its evaluation 330 of the costs and benefits of persisting the message, following by initiation 340 of a write to disk or deferral 350 of persistence until a timer expires.

FIG. 5 represents the steps of a method as performed at an originating messaging system, according to another embodiment of the invention. The sender application program again creates 400 a message and issues a 'put_message' command that identifies the target messaging manager and queue. However, instead of specifying a persistence attribute explicitly, the sender specifies 400 a message value within the message header. The local messaging manager 30 reads 410 the message header and determines which local queue to place the message on, and enqueues the message accordingly. In this embodiment, different value messages are saved to the same queue. Assuming the target queue is not managed by the local queue manager, a mover within the local messaging manager subsequently retrieves 420 the message and sends the message to a next messaging manager on route to the target messaging manager. The message value is transferred with the message, to enable persistence determinations to be performed at any of the messaging systems visited by the message. While the message is held locally, the local persistence manager 80 is responsible for determining whether to save the message to local persistent storage 90. The persistence manager reads the header information for messages on its queues and performs 430 an evaluation of the costs and benefits of saving to persistent storage. As described above, this evaluation takes account of the message value in assessing the benefits of saving persistently, such as the business cost of losing or duplicating messages for a given message value and risk of message loss. The persistence manager may then initiate 440 a write to disk or set 450 a timer for a next evaluation as described above.

Figure 6:
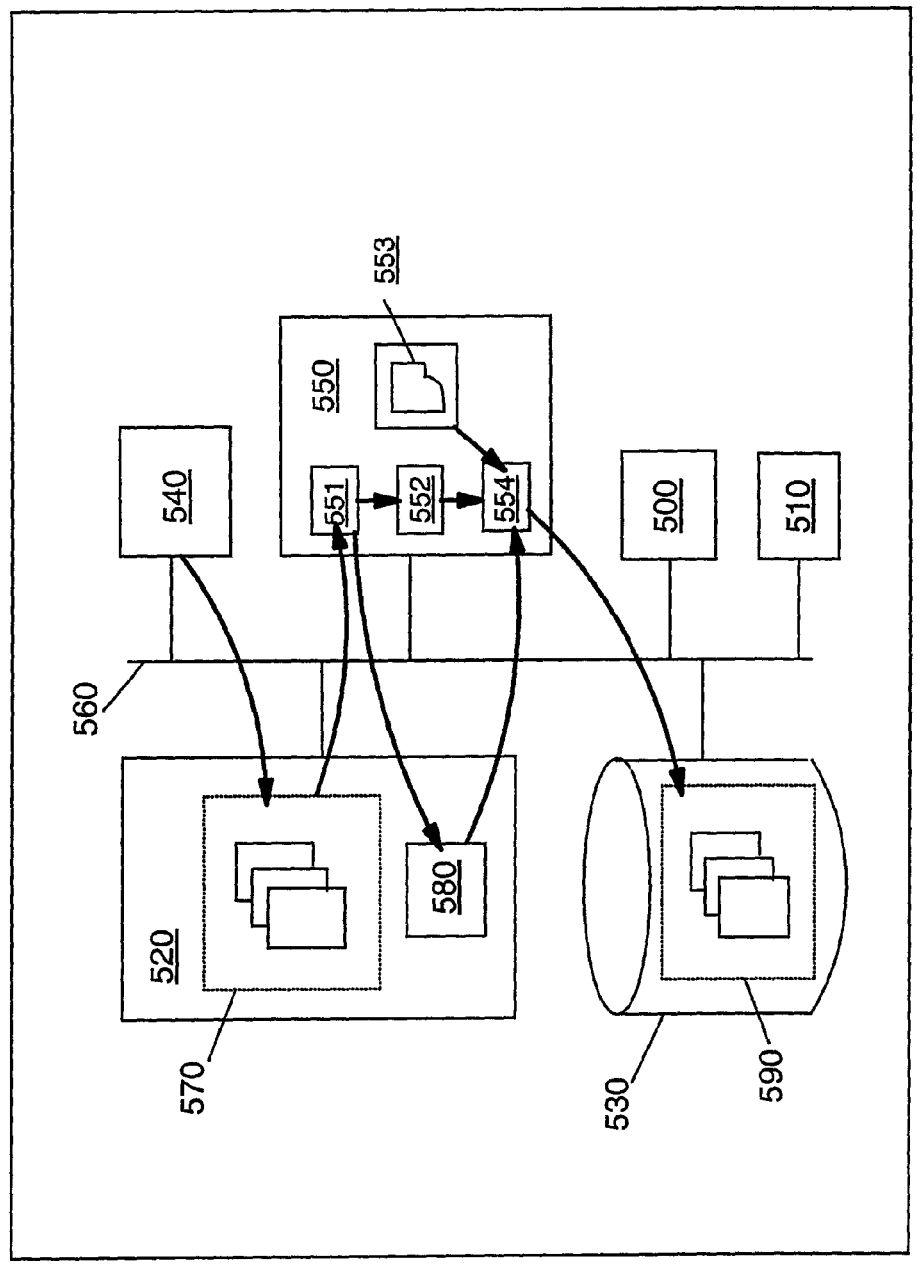
FIG. 6 is a schematic representation of a database management system according to another embodiment of the invention.

FIG. 6 represents a database system showing components of another embodiment of the invention for managing persistent storing of database updates. Various components of the system including a processor 500, input/output components 510, a volatile random access memory (RAM) 520, a non-volatile disk storage system 530, a database manager 540 and a persistence manager 550 are shown connected via a system bus 560. The persistence manager 550 comprises a data collector 551, a trigger component 552, a rules repository 553 and an evaluator component 554. The database manager 540 manages a set of database tables 570 held in the RAM 520, performing reads and writing data updates (additions, deletions and updates) to the database 570. The collector component 551 detects data updates and saves information relating to the updates and other information relating to conditions within the database system to a second database 580 within the RAM 520. In response to trigger conditions identified by the trigger component 552, the evaluator component 554 applies rules obtained from the rules repository 553 to the data held in the second database 580, evaluating the costs and benefits of saving to persistent storage. This evaluation is used to perform a determination of whether to save the data updates to a persistent replica 590 of the database 570 within the non-volatile data store 530. This provides a database system that is suitable for low overhead (and potentially high performance) storage of low value data items, since the writing of data to non-volatile storage such as disk storage is only performed when the evaluation makes a positive determination that a persistent save is required.

The invention claimed is:

1. A data processing system for managing persistence, comprising:
   a non-volatile data store coupled to a computer;
   a volatile data store coupled to the computer; and,
   a persistence manager executing in a memory of the computer, the persistence manager comprising program code that when executed in the memory of the computer causes the computer to:
   evaluate at least one criterion of a set of criteria representing both costs of saving data to the non-volatile data store and also risks associated with not saving data to the non-volatile data store in order to determine whether or not a data update held in the volatile data store requires saving to the non-volatile data store, the evaluation comprising receiving a value representing a number of messages read from a queue per second, applying an exponential smoothing algorithm to the value representing the number of messages read from the queue per second to generate a message processing rate value, and storing the message processing rate in a database;
   determine whether to save the data update to the non-volatile data store based upon the evaluation of the at least one criterion of the set of criteria;
   in response to determining that the data update should be saved to the non-volatile data store, initiate a save of the data update to the non-volatile data store;
   in response to determining that the data update should not be saved to the persistent storage, set a timer for a next evaluation; and,
   determine whether to save the data update to the persistent storage based upon evaluating the at least one criterion of the set of criteria after an expiration of the timer.

2. The data processing system according to claim 1, wherein the persistence manager further includes program code to evaluate a risk of loss of data in the absence of the save of the data update to the non-volatile data store.

3. The data processing system according to claim 2, wherein the persistence manager further includes program code to compute a potential cost of loss of data based on a value of the data update and said risk of loss of data.

4. The data processing system according to claim 1, wherein the persistence manager further includes program code to evaluate a risk of duplicating the data update in the absence of the save of the data update to the non-volatile data store.

5. The data processing system according to claim 1, wherein the persistence manager further includes program code to evaluate a performance characteristic of the data processing apparatus.

6. The data processing system according to claim 1, wherein the persistence manager further includes program code to evaluate a time period remaining before log records will be written to the non-volatile data store.

7. The data processing system according to claim 1, further comprising a database manager executing in a memory of the data processing apparatus and configured to apply data updates including data updates, data additions, and data deletions to database tables held in the volatile data store, and wherein the persistence manager further comprises program code to detect the data updates to the database tables and to determine whether the data updates, the data additions and the data deletions require saving to the non-volatile data store based on said evaluating of at least one criterion.

8. A method for managing persistence of data within a data processing apparatus, comprising the steps of:
   evaluating, by a persistence manager executing in a memory of a computer, at least one criterion of a set of criteria, the set of criteria representing both costs of saving data to persistent storage and also risks associated with not saving data to the persistent storage, to determine whether to save a data update to the persistent storage, where evaluating the at least one criterion of the set of criteria comprises receiving a value representing a number of messages read from a queue per second, applying an exponential smoothing algorithm to the value representing the number of messages read from the queue per second to generate a message processing rate value, and storing the message processing rate in a database;
   determining, by the persistence manager, whether to save the data update to the persistent storage based upon evaluating the at least one criterion of the set of criteria;
   in response to determining that the data update should be saved to the persistent storage, initiating, by the persistence manager, a save of the data update to the persistent storage;
   in response to determining that the data update should not be saved to the persistent storage, setting, by the persistence manager, a timer for a next evaluation; and,
   determining, by the persistence manager, whether to save the data update to the persistent storage based upon evaluating the at least one criterion of the set of criteria after an expiration of the timer.

9. A computer program product comprising a set of instructions implemented in program code on a non-transitory recording medium for controlling performance of a data processing apparatus on which the program code executes, to perform a method comprising the steps of:
   evaluating, by a persistence manager executing in a memory of a computer, at least one criterion of a set of criteria, the set of criteria representing both costs of saving data to persistent storage and also risks associated with not saving data to the persistent storage, to determine whether to save a data update to the persistent storage, where evaluating the at least one criterion of the set of criteria comprises receiving a value representing a number of messages read from a queue per second, applying an exponential smoothing algorithm to the value representing the number of messages read from the queue per second to generate a message processing rate value, and storing the message processing rate in a database;
   determining, by the persistence manager, whether to save the data update to the persistent storage based upon evaluating the at least one criterion of the set of criteria;
   in response to determining that the data update should be saved to the persistent storage, initiating, by the persistence manager, a save of the data update to the persistent storage;
   in response to determining that the data update should not be saved to the persistent storage, setting, by the persistence manager, a timer for a next evaluation; and,
   determining, by the persistence manager, whether to save the data update to the persistent storage based upon evaluating the at least one criterion of the set of criteria after an expiration of the timer.

10. The method of claim 8, wherein determining whether to save the data update to the persistent storage further comprises determining when to save the data update to the persistent storage including one of periodically and in response to a trigger condition.

11. The method of claim 10, wherein the trigger condition includes one of a detection of a system problem, when a message is placed in the queue, and when a queue depth of the queue reaches a threshold number of messages.

12. The method of claim 8, further comprising:
   evaluating, by the persistence manager, a risk of loss of data in the absence of the save of the data update to the persistent storage.

13. The method of claim 12, further comprising:
   computing, by the persistence manager, a potential cost of loss of data based on a value of the data update and said risk of loss of data.

14. The method of claim 8, further comprising:
   evaluating, by the persistence manager, a risk of duplicating the data update in the absence of the save of the data update to the persistent storage.

15. The method of claim 8, further comprising:
   evaluating, by the persistence manager, a performance characteristic of the data processing apparatus.

16. The method of claim 8, further comprising:
   evaluating, by the persistence manager, a time period remaining before log records will be written to the persistent storage.

17. The computer program product of claim 9, wherein determining whether to save the data update to the persistent storage further comprises determining when to save the data update to the persistent storage including one of periodically and in response to a trigger condition.

18. The data processing system according to claim 1, wherein the program code that when executed causes the computer to evaluate the at least one criterion of the set of criteria further comprises program code that when executed causes the computer to evaluate at least a first criterion representing a cost of saving data to the non-volatile data store and a second criterion representing a risk associated with not saving data to the non-volatile data store and to compare at least the first criterion and the second criterion to make said determination.

* * * * *